(12) United States Patent
Mizrotsky et al.

(10) Patent No.: US 9,239,862 B2
(45) Date of Patent: Jan. 19, 2016

(54) WEB ACCELERATION BASED ON HINTS DERIVED FROM CROWD SOURCING

(71) Applicant: Qualcomm iSkoot, Inc., San Diego, CA (US)

(72) Inventors: Eitan Mizrotsky, Jerusalem (IL); Gabriel Berelejis, Bet Shemesh (IL)

(73) Assignee: QUALCOMM INCORPORATED, San Diego, CA (US)

( * ) Notice: Subject to any disclaimer, the term of this patent is extended or adjusted under 35 U.S.C. 154(b) by 239 days.

(21) Appl. No.: 13/874,270

(22) Filed: Apr. 30, 2013

(65) Prior Publication Data

US 2013/0297561 A1 Nov. 7, 2013

Related U.S. Application Data

(60) Provisional application No. 61/641,195, filed on May 1, 2012.

(51) Int. Cl.
*G06F 17/30* (2006.01)
*H04L 29/06* (2006.01)
*H04L 29/08* (2006.01)

(52) U.S. Cl.
CPC .......... *G06F 17/30424* (2013.01); *H04L 67/00* (2013.01); *H04L 67/02* (2013.01); *H04L 67/2842* (2013.01); *H04L 67/42* (2013.01)

(58) Field of Classification Search
None
See application file for complete search history.

(56) References Cited

U.S. PATENT DOCUMENTS 6,085,193 A 7/2000 Malkin et al.
6,385,641 B1 5/2002 Jiang et al.
6,549,896 B1* 4/2003 Candan et al.
6,721,780 B1 4/2004 Kasriel et al.
7,483,941 B2 1/2009 Carlson et al.
7,747,749 B1 6/2010 Erikson et al.
8,543,907 B1* 9/2013 Roskind ........................ 715/234
2006/0294223 A1* 12/2006 Glasgow et al. .............. 709/224
2010/0228880 A1* 9/2010 Hunt et al. .................... 709/246
2013/0031459 A1 1/2013 Khorashadi et al.
2014/0149850 A1 5/2014 Khorashadi et al.

FOREIGN PATENT DOCUMENTS

EP 1398715 A2 3/2004
WO 9917227 A1 4/1999
WO 2007009252 A1 1/2007

OTHER PUBLICATIONS

International Search Report and Written Opinion—PCT/US2013/039125—ISA/EPO—Aug. 7, 2013.

* cited by examiner

*Primary Examiner* — Jay Morrison
(74) *Attorney, Agent, or Firm* — Muncy, Geissler, Olds & Lowe, P.C.

(57) ABSTRACT

In an embodiment, a UE determines to load a web page via a mobile browsing application on the UE. The UE obtains, from a web server, web page resource information for loading the web page on the UE. The UE loads the web page using the web page resource information and identifies one or more hints for assisting one or more mobile browsing applications on at least one other UE to perform an initial load of the web page, which the UE then reports to a hints server. The hints server collects hints from the UE as well as other UEs, evaluates their relevance and generates and/or updates a crowd-sourced hints list based on their perceived relevance. The hints server provides the crowd-sourced hints list to a target UE, and the target UE uses the crowd-sourced hints list to load the web page.

46 Claims, 11 Drawing Sheets

WEB ACCELERATION BASED ON HINTS DERIVED FROM CROWD SOURCING

CLAIM OF PRIORITY UNDER 35 U.S.C. §119

The present Application for Patent claims priority to Provisional Application No. 61/641,195 entitled "WEB ACCELERATION BASED ON HINTS DERIVED FROM CROWD SOURCING", filed May 1, 2012, by the same inventors as the subject application, assigned to the assignee hereof and hereby expressly incorporated by reference herein.

BACKGROUND OF THE INVENTION

1. Field of the Invention

Embodiments relate to web acceleration based on hints derived from crowd sourcing.

2. Description of the Related Art

It is typical for mobile devices to execute web browsing applications that load web pages from one or more web servers via the Internet. An initial load of a web page will typically require processing at a given mobile device as well as the web server providing the web page before the web page can be loaded on the given mobile device (e.g., DNS resolution, web-page redirection, etc.). The processing associated with the initial load of the web page can be cached by the given mobile device as web page information, such that subsequent loads of the web page can be performed more quickly than the initial load of the web page. Each mobile device loading a particular web page for the first time may experience these initial loading delays, which can degrade performance of the web browsing application.

SUMMARY

In an embodiment, a UE determines to load a web page via a mobile browsing application on the UE. The UE obtains, from a web server, web page resource information for loading the web page on the UE. The UE loads the web page using the web page resource information and identifies one or more hints for assisting one or more mobile browsing applications on at least one other UE to perform an initial load of the web page, which the UE then reports to a hints server. The hints server collects hints from the UE as well as other UEs, evaluates their relevance and generates and/or updates a crowd-sourced hints list based on their perceived relevance. The hints server provides the crowd-sourced hints list to a target UE, and the target UE uses the crowd-sourced hints list to load the web page.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
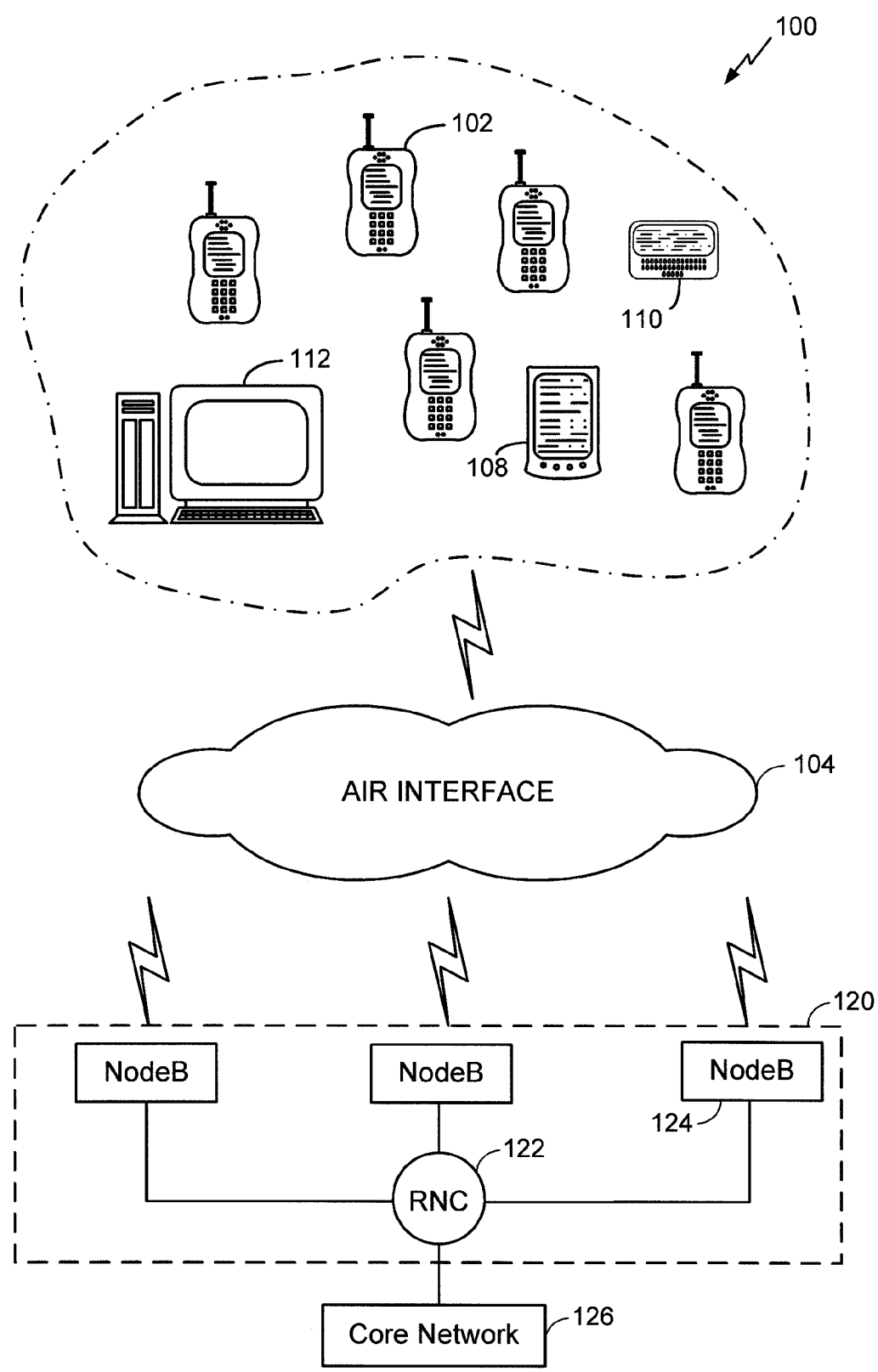
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant or tablet computer 108, a pager or laptop 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal," "AT," "wireless device," "client device," "mobile terminal," "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2:
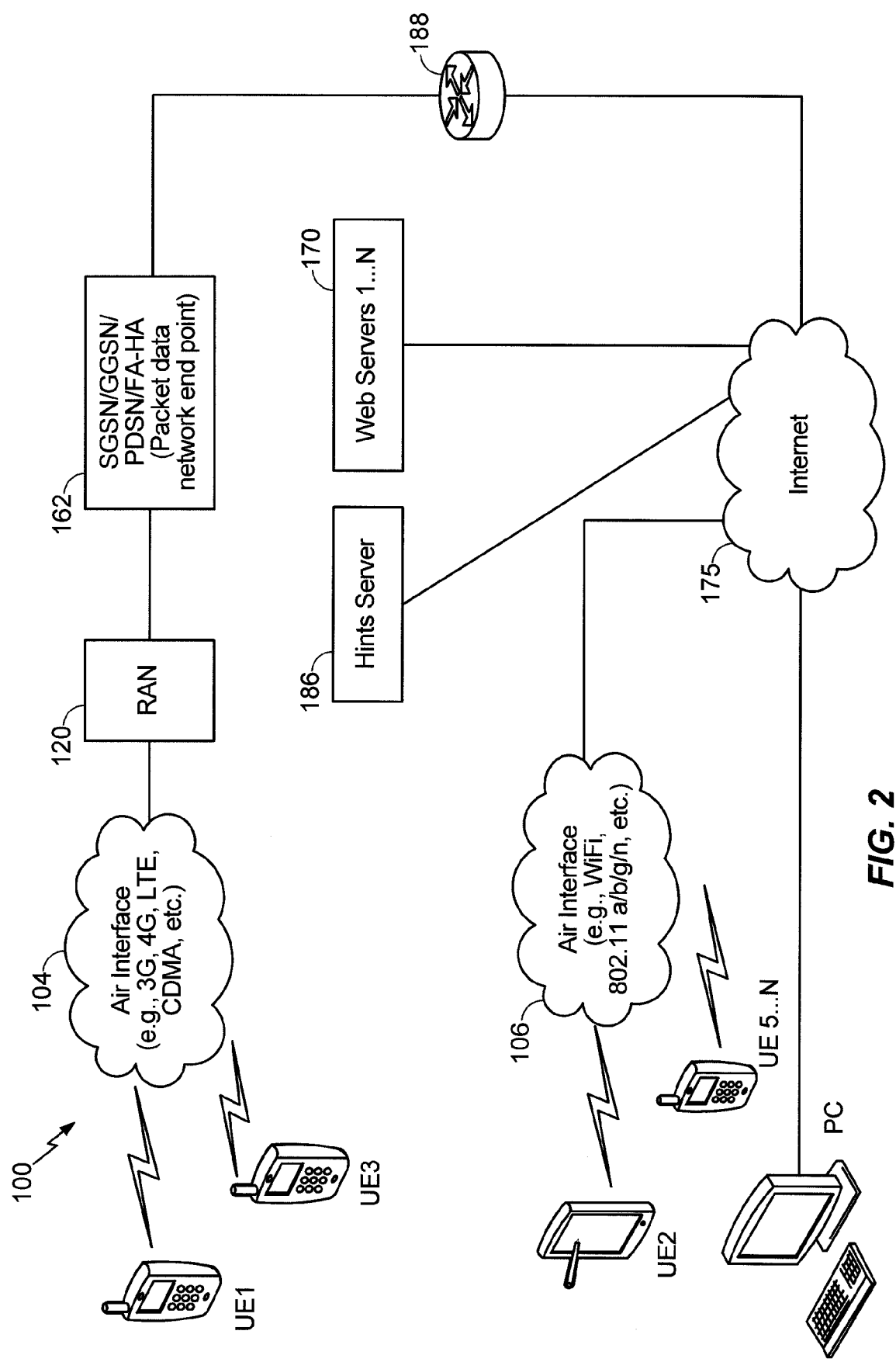
FIG. 2 illustrates a core network according to an embodiment of the present invention.

FIG. 2 illustrates an example of the wireless communications system 100 of FIG. 1 in more detail. In particular, referring to FIG. 2, UEs 1 . . . N are shown as connecting to the RAN 120 at locations serviced by different packet data network end-points. The illustration of FIG. 2 is specific to W-CDMA systems and terminology, although it will be appreciated how FIG. 2 could be modified to conform with various other wireless communications protocols (e.g., LTE, EV-DO, UMTS, etc.) and the various embodiments are not limited to the illustrated system or elements.

UEs 1 and 3 connect to the RAN 120 at a portion served by a first packet data network end-point 162 (e.g., which may correspond to SGSN, GGSN, PDSN, a home agent (HA), a foreign agent (FA), PGW/SGW in LTE, etc.). The first packet data network end-point 162 in turn connects, via the routing unit 188, and through the routing unit 188, to the Internet 175. Through the Internet 175, the UEs 1 and 3 can connect to any of web servers 1 . . . N 170 that are configured to provide content associated with web pages (e.g., text, image data, streaming video, etc.). Also, through the Internet 175, UEs 1 and 3 can connect to a hints server 186. UEs 2 and 5 . . . N connect to the Internet 175 via a different air interface 106, such as a WiFi or IEEE 802.11 a/b/g/n interface via a local wireless access point or hotspot. UE 4 connects directly to the Internet 175 via a wired connection (e.g., a LAN or Ethernet connection), and through the Internet 175 can then connect to any of the system components described above.

Referring to FIG. 2, UEs 1, 3 and 4 . . . N are illustrated as wireless cell-phones, UE 2 is illustrated as a wireless tablet and/or laptop PC. However, in other embodiments, it will be appreciated that the wireless communication system 100 can connect to any type of UE, and the examples illustrated in FIG. 2 are not intended to limit the types of UEs that may be implemented within the system.

Figure 3:
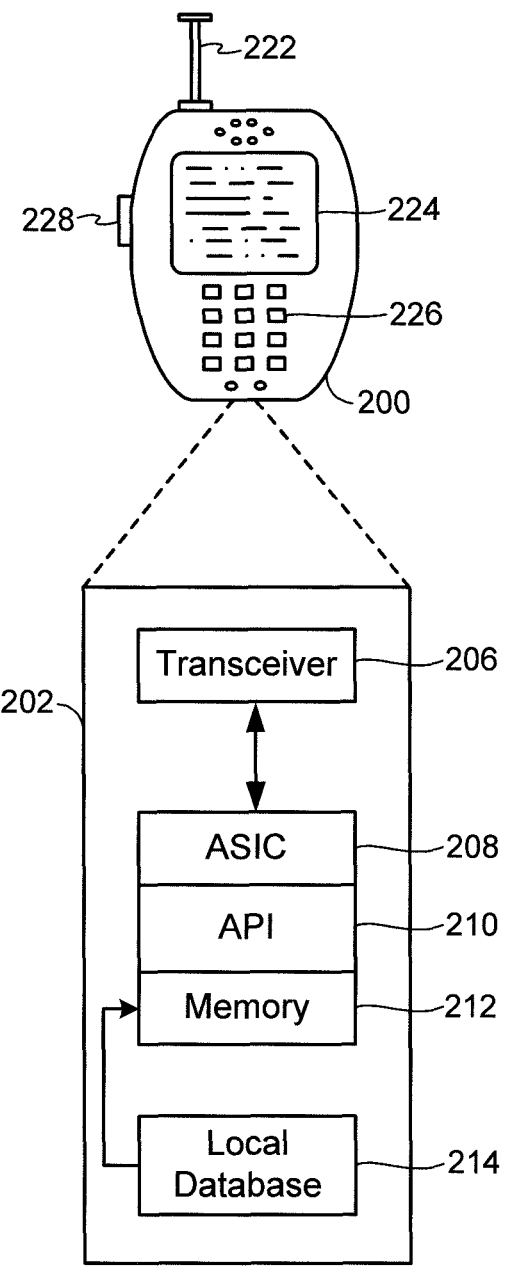
FIG. 3 is an illustration of a user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet 175 and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies or transport mechanisms, such as code division multiple access (CDMA), W-CDMA, time division multiple access (TDMA), frequency division multiple access (FDMA), Orthogonal Frequency Division Multiplexing (OFDM), the Global System for Mobile Communications (GSM), 3GPP Long Term Evolution (LTE) or other protocols that may be used in a wireless communications network or a data communications network. Accordingly, the illustrations provided herein are not intended to limit the embodiments of the invention and are merely to aid in the description of aspects of embodiments of the invention.

Figure 4A:
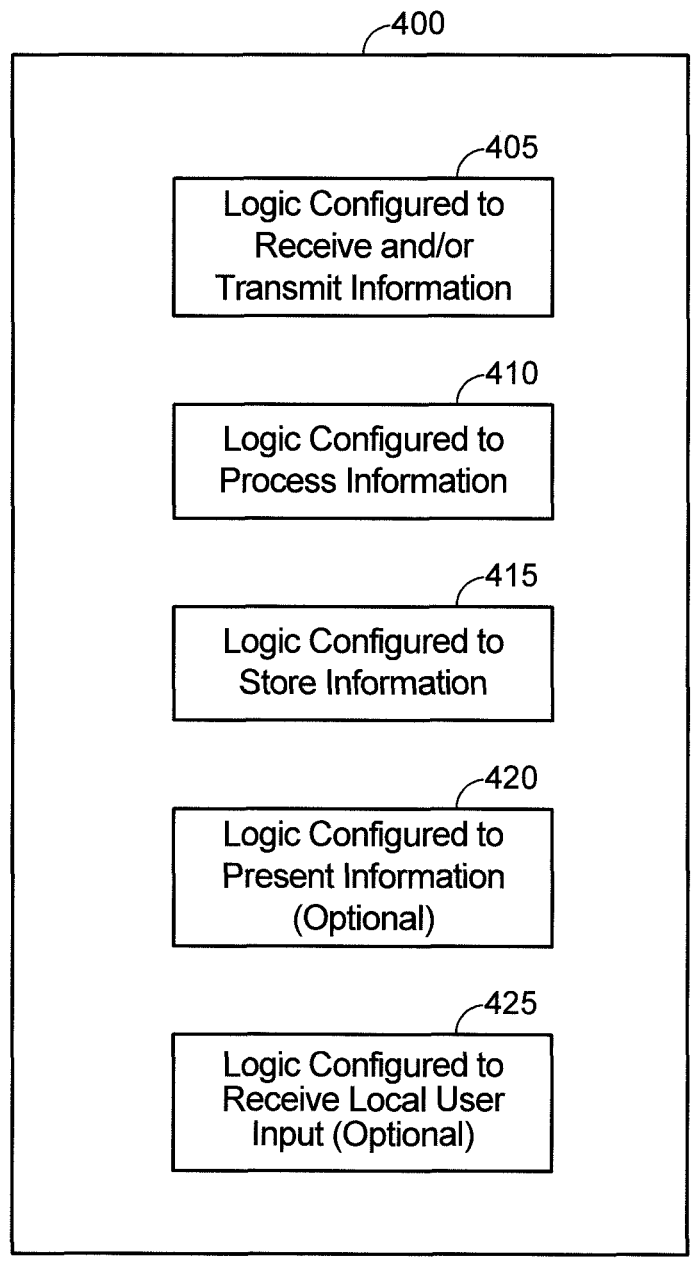
FIG. 4A illustrates a communication device that includes logic configured to perform functionality in accordance with an embodiment of the invention.

FIG. 4A illustrates a communication device 400 that includes logic configured to perform functionality. The communication device 400 can correspond to any of the above-noted communication devices, including but not limited to UEs 102, 108, 110, 112 or 200, Node Bs or base stations 120, the RNC or base station controller 122, a packet data network end-point (e.g., SGSN, GGSN, a Mobility Management Entity (MME) in Long Term Evolution (LTE), etc.), any of the servers 170 through 186, etc. Thus, communication device 400 can correspond to any electronic device that is configured to communicate with (or facilitate communication with) one or more other entities over a network.

Referring to FIG. 4A, the communication device 400 includes logic configured to receive and/or transmit information 405. In an example, if the communication device 400 corresponds to a wireless communications device (e.g., UE 200, Node B 124, etc.), the logic configured to receive and/or transmit information 405 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., SGSN, GGSN, web server 170, hints server 186, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4A, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4A, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4A, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 200 as shown in FIG. 3, the logic configured to present information 420 can include the display 224. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4A, the communication device 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 200 as shown in FIG. 3, the logic configured to receive local user input 425 can include the display 224 (if implemented a touch-screen), keypad 226, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4A, while the configured logics of 405 through 425 are shown as separate or distinct blocks in FIG. 4A, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 4B:
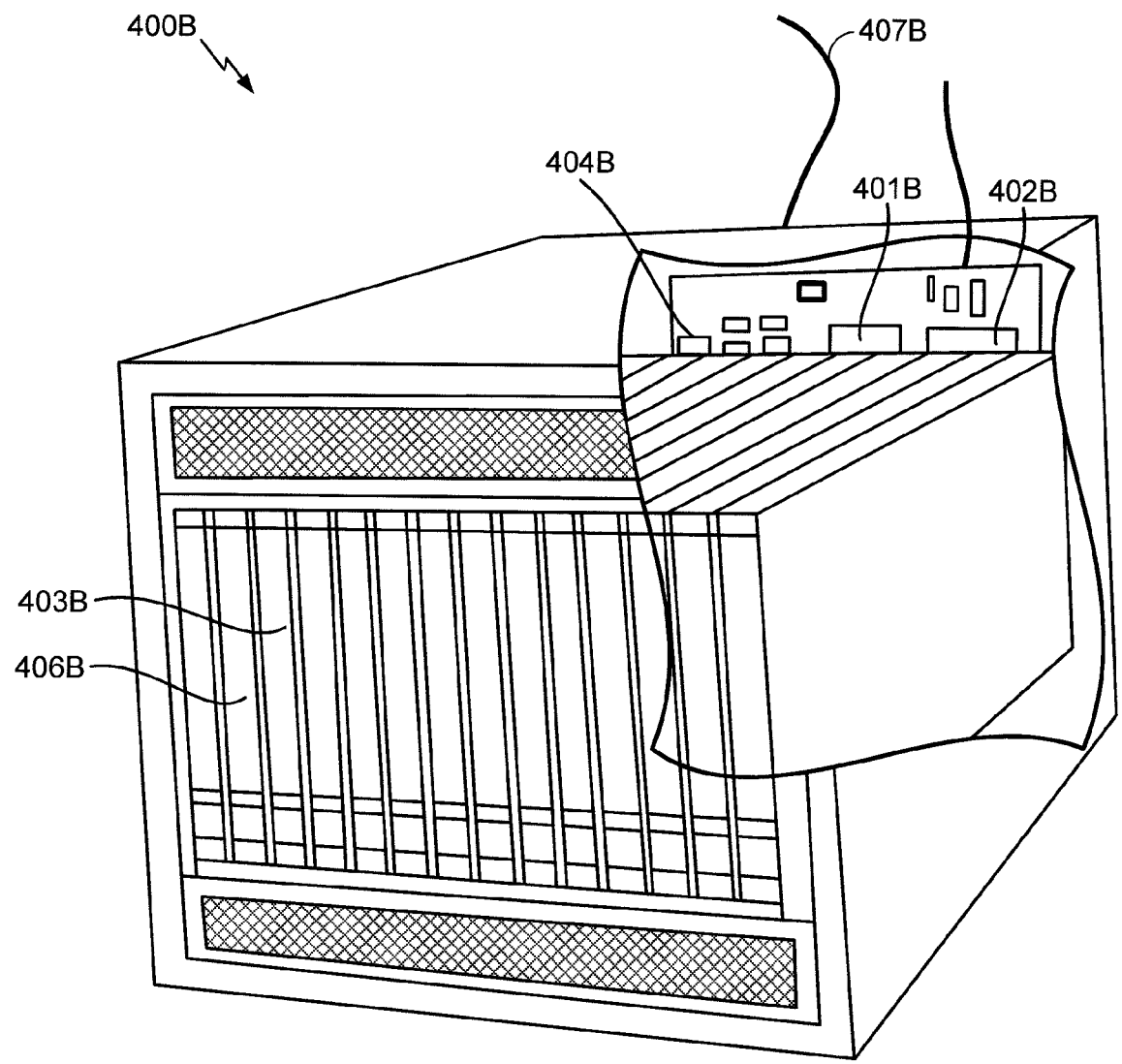
FIG. 4B illustrates a server in accordance with an embodiment of the invention.

The various embodiments may be implemented on any of a variety of commercially available server devices, such as server 400B illustrated in FIG. 4B. In an example, the server 400B may correspond to one example configuration of the application server 170 described above. In FIG. 4B, the server 400B includes a processor 401B coupled to volatile memory 402B and a large capacity nonvolatile memory, such as a disk drive 403B. The server 400B may also include a floppy disc drive, a writeable compact disc (CD) or writeable DVD disc drive 406B coupled to the processor 401B. The server 400B may also include network access ports 404B coupled to the processor 401 for establishing data connections with a network 407B, such as a local area network coupled to other broadcast system computers and servers or to the Internet. In context with FIG. 4A, it will be appreciated that the server 400B of FIG. 4B illustrates one example implementation of the communication device 400, whereby the logic configured to transmit and/or receive information 405 corresponds to the network access ports 404B used by the server 400B to communicate with the network 407B, the logic configured to process information 410 corresponds to the processor 401B, and the logic configuration to store information 415 corresponds to any combination of the volatile memory 402B, the disk drive 403B and/or the disc drive 406B. The optional logic configured to present information 420 and the optional logic configured to receive local user input 425 are not shown explicitly in FIG. 4B and may or may not be included therein. Thus, FIG. 4B helps to demonstrate that the communication device 400 may be implemented as a server, in addition to a UE implementation as in FIG. 3.

It is typical for mobile devices that use the above-noted communication systems or other types of access networks (e.g., WiFi, etc.) to execute web browsing applications that load web pages from one or more web servers via the Internet 175. An initial load of a web page will typically require processing at a given mobile device as well as the web server providing the web page before the web page can be loaded on the given mobile device (e.g., DNS resolution, web-page redirection, etc.). Data associated with the processing of the initial load of the web page can be cached by the given mobile device as web page resource information, such that subsequent loads of the web page can leverage the cached data and thereby be performed more quickly than the initial load of the web page. Each mobile device loading a particular web page for the first time may experience these initial loading delays, which can degrade performance of the web browsing application.

Accordingly, embodiments of the present invention relate to reporting the web page resource information used to expedite loading of web pages at a first set of UEs to the hints server 186, which in turn propagates a filtered version of the reported web page resource information to a second set of UEs to expedite the initial load of the corresponding web pages at the second set of UEs. As used herein, the web page resource information associated with the loading of the web page is alternatively referred to as a "hint" or "hints", because this information provides hints to the second set of UEs with regard to how associated web page(s) can be loaded more quickly during an initial load of the web page(s).

Figure 5A:
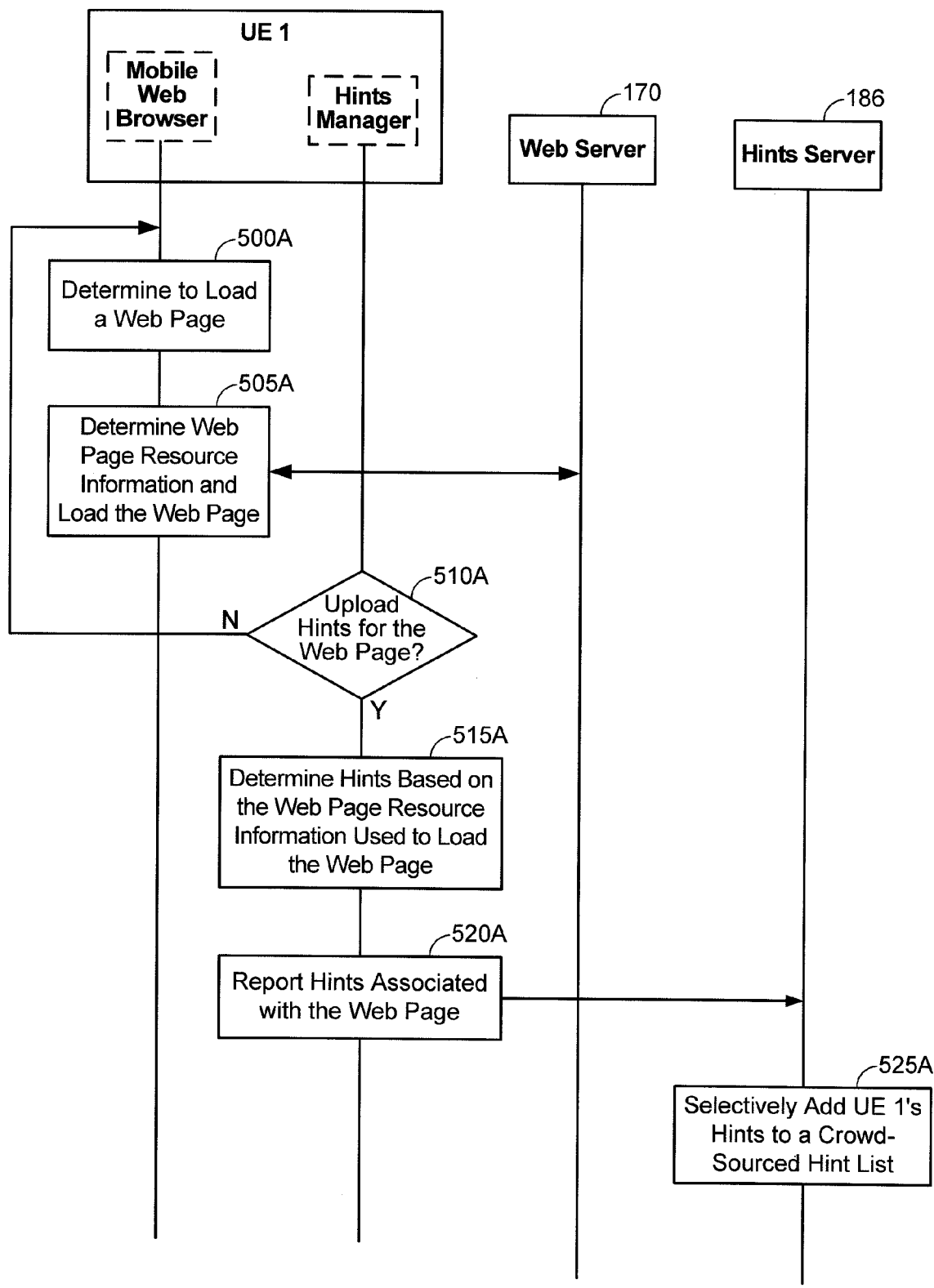
FIG. 5A illustrates a process of acquiring and transmitting hints from a given UE to a hints server in accordance with an embodiment of the present invention.

FIG. 5A illustrates a process of acquiring and transmitting hints from a given UE ("UE 1") to the hints server 186 in accordance with an embodiment of the present invention. Referring to FIG. 5A, assume that UE 1 is provisioned with a mobile web browser application ("mobile web browser") and a hints manager application ("hints manager"). The hints manager can either be part of the mobile web browser, or alternatively can be an executable module that is separate from the mobile web browser. At some point during the operation of UE 1, the mobile web browser determines to load a web page, 500A. The web page loading at 500A can correspond to an initial load of the web page by the mobile web browser or a re-loading of the web page (where some web page resource information for loading the web page may already be cached locally on the mobile web browser). After determining to load the web page, the mobile web browser determines the web page resource information for loading the web page and downloads the web page from the web server 170, 505A. As will be appreciated, the web page resource information acquired at 505A can either be retrieved entirely based on UE 1's communication with the web server 170, or alternatively can be at least partially based upon cached web page resource information if the loading of the web page is not an initial load.

Referring to 505A of FIG. 5A, the web page resource information used to load the web page can include information such as (i) IP addresses attached to Uniform Resource Locators (URLs) embedded within the web page (e.g., if the web page being loaded embeds five (5) advertisement links and four (4) content image links, IP addresses for each of these links or URLs are required to look-up the associated advertisements and content images), (ii) re-direction chains (e.g., if the mobile web browser is re-directed from a main web page to a mobile-specific web page, the web page resource information can include the mobile-specific web page) and so on. As will be appreciated, during an initial load of the web page without any "hints", UE 1 would be required to perform Domain Name System (DNS) resolution to acquire the IP addresses of URLs included in a web page, after which the IP addresses of the URLs are contacted to download the content to be loaded into the web page's presentation on UE 1.

After completing the loading of the web page at 505A, the hints manager determines whether to upload hints associated with the loading of the web page at 510A. The determination of 510A can be implemented in a number of different ways. In an example, the hints manager may decide to upload the hints for the web page in response to an active poll for hints received at UE 1 from the hints server 186. In another example, the hints manager may execute a set of hints update rules to self-determine whether or not to upload the hints for the web page. The set of hints update rules can include periodic hint update rule(s) (e.g., send hints updates for each web page loaded by UE 1 in a given interval at 20 minute intervals, send hints updates for a particular web page at every Nth loading of the web page and not for each loading of the web page, etc.), event-based hint update rule(s) (e.g., transmit the hints based on network connection type, such as in response to establishing a WiFi connection), pseudo-random or probabilistic hint update rule(s) (e.g., so a target percentage of web page loads are reported via a hints update) and/or any combination thereof. The set of hints update rules can be provisioned into the hints manager by the hints server 186, in an example.

Referring to FIG. 510A, if the hints manager determines not to upload the hints for the web page, the process returns to 500A and waits for the mobile web browser to initiate a load of another web page. Otherwise, the hints manager determines the hints to be uploaded to the hints server 186 based on the web page resource information used to load the web page at 505A, 515A. Accordingly, the IP addresses acquired via DNS resolution during the loading of 505A can be included among the hints determined at 515A, any re-direction chains can be included among the hints determined at 515A, and so on. The hints determined at 515A are reported by the hints manager of UE 1 to the hints server 186, 520A. At 525A, the hints server 186 selectively adds UE 1's hints to a crowd sourced hint list maintained at the hints server 186. The management of the crowd-sourced hint list that occurs at 525A of FIG. 5A is explained in more detail below with respect to FIG. 5B.

In an alternative embodiment of FIG. 5A, the hints manager on UE 1 need not determine and report the hints explicitly to the hints server 186 at 520A. Instead, the hints manager on UE 1 may mark resource requests to prompt a proxy server (such as the hints server 186 itself or some other proxy server) to load hints at the hints server 186 on behalf of UE 1. In this alternative embodiment, the determination of 510A can occur before 505A, and if the hints manager at 510A determines to upload hints for the web page, the hints manager on UE 1 marks one or more resource requests (e.g., web page requests) during 505A which are intercepted by the hints server 186 acting as a proxy server. Thus, FIG. 5A illustrates an example whereby hints are independently determined at UE 1 and then reported to the hints server 186, but other embodiments can be directed to implicit hint reporting whereby UE 1 simply pings another network entity to gather the hints on UE 1's behalf for delivery (if necessary) to the hints server 186. An example of using the hints server 186 as a proxy server for implicit requests of the crowd-sourced hints list is provided below with respect to FIG. 6C, but it will be readily appreciated how the use of the hints server 186 as a proxy server can also accommodate delegation of hints generation and/or reporting on the network-side as well.

Skipping ahead to a further example related to the alternative embodiment to FIG. 5A that is mentioned in the preceding paragraph, assume that UE 1 at 600C requests the given web page (e.g., with URL http://x.y.z) through the proxy server or hints server 186. UE 1 then receives the given web page at 625C. In this case, receipt of the given web page at 625C prompts UE 1 to send additional resource requests (e.g., for images embedded in the page, etc.) during 635C. These additional resource requests can be marked as hint-related, such that the proxy server or hints server 186 can intercept the marked resource requests and interpret the marked resource requests as hints for the given web page (e.g., for URL http://x.y.z). Thereby, the hints server 186 may be able to populate the crowd-sourced hint list at least in part based on the implicit hint reporting (e.g., based on marked hint-related packets in lieu of an explicit hint notification report). This aspect will be discussed in more detail below with respect to FIG. 6C.

Figure 5B:
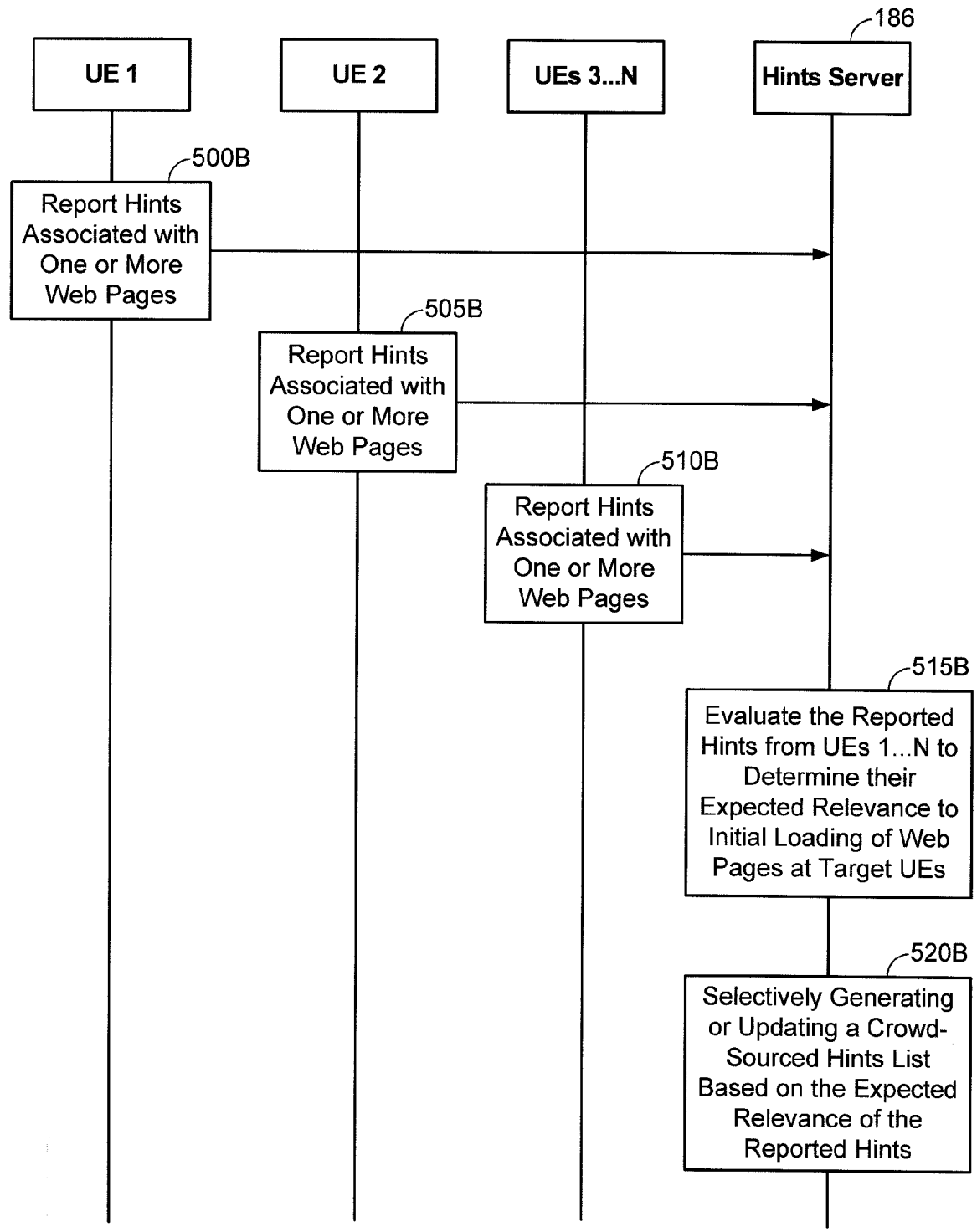
FIG. 5B illustrates a process of selectively generating or updating a crowd-sourced hints list in accordance with an embodiment of the invention.

Referring to FIG. 5B, assume that 500A through 520A of FIG. 5A executes at each of a plurality of UEs 1 ... N, such that UEs 1 ... N each report their respective hints (via explicit or direct reporting, or implicit or indirect reporting as in the alternative example provided above) for loading one or more web pages, 500B, 505B and 510B. The web pages for which hints are reported by UEs 1 ... N may or may not overlap. At 515B, the hints server 186 evaluates the reported hints from UEs 1 ... N to determine their expected relevance to the initial load of the associated web pages at target UEs, 515B.

Referring to 515B of FIG. 5B, an example of the evaluation of 515B may include identifying a set of hints from multiple UEs for the same web page. Hints that are determined to repeat often for different of the multiple UEs may be deemed relevant, and hints that are specific to a particular UE and are not repeated by other UEs are deemed less relevant. For example, it is common for web pages to include sets of targeted advertisements based on user preferences of the user loading the web page. In this case, it is likely that the targeted advertisements will be different for different users loading the same web page. On the other hand, content information that is not advertisement related is not usually targeted to particular users and is thereby less likely to change from user to user when the same web page is loaded. Accordingly, hints that include the IP addresses attached to content-related URLs may be deemed as more relevant to a potential target UE that is going to be performing an initial load of the web page as compared to hints that include the IP addresses attached to advertisement-related URLs within the web page.

In a further example of 515B, the relevance of the reported hints can be based on time and not just prevalence. For example, each reported hint may be associated with a finite shelf life or expiration period. The expiration period can be extended each time an equivalent or duplicative hint is reported by one of the UEs 1 ... N. However, if a particular hint expires and is not renewed, the hint can be deemed no longer relevant at 515B.

Referring to FIG. SB, the hints server 186 may selectively generate or update a crowd-sourced hint list based on the evaluation from 515B, 520B. For example, the more relevant hints may be added to the crowd-sourced hint list, and the less relevant hints may be omitted or excluded from the crowd-sourced hint list. For instance, each hint may be allocated a relevance value at 515B, and the relevance values may be compared against a threshold at 520B to determine whether the respective hint should be added to or excluded from the crowd-sourced hint list.

Figure 6A:
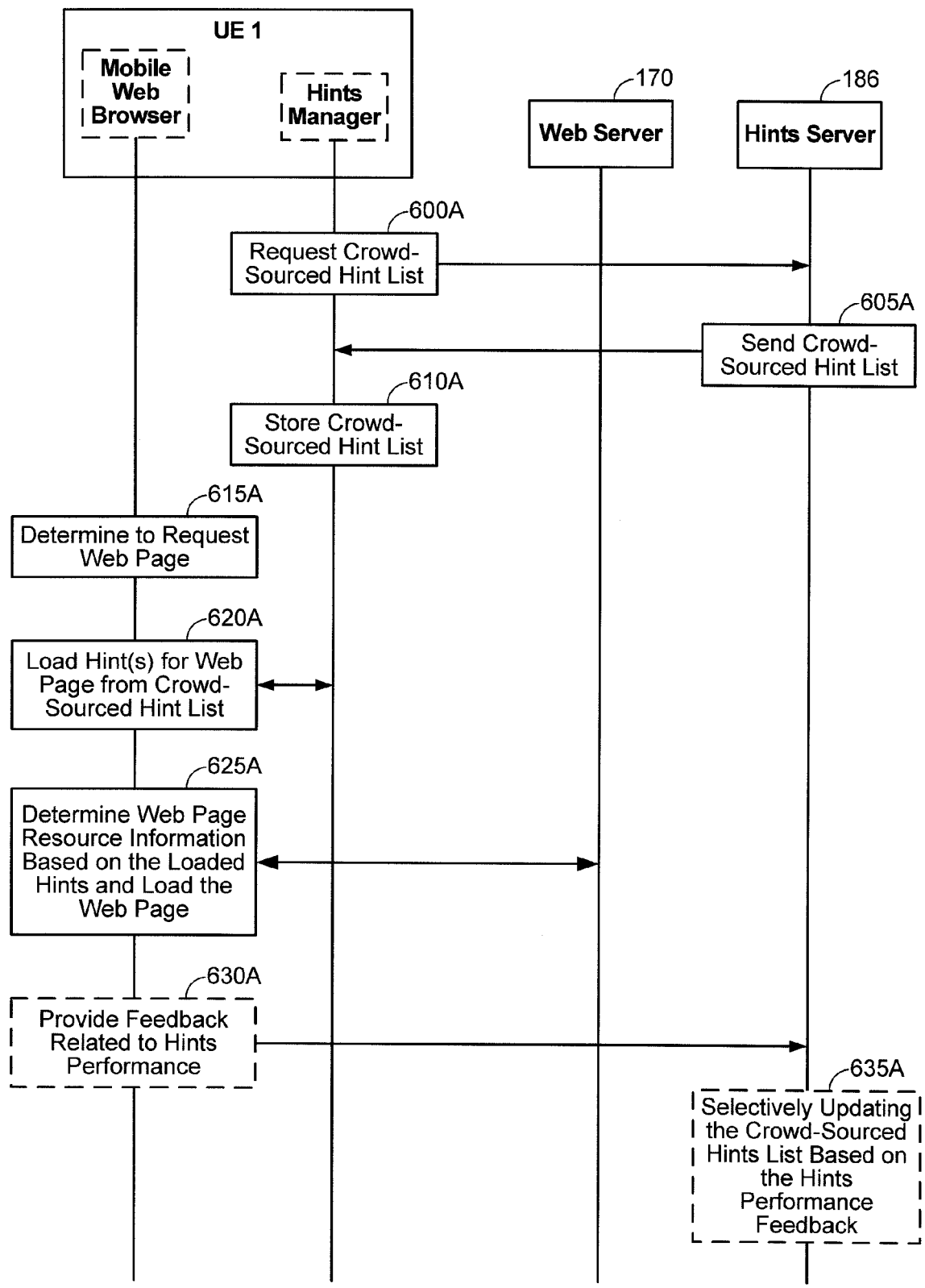
FIG. 6A illustrates a process of performing an initial load of a web page at a target UE based on the crowd-sourced hint list in accordance with an embodiment of the invention.

FIG. 6A illustrates a process of performing an initial load of a web page based on a crowd-sourced hint list in accordance with an embodiment of the invention. Referring to FIG. 6A, assume that target UE 1 has not yet loaded a given web page or at least does not have cached web page resource information for the given web page. Under this assumption, a hints manager at target UE 1 requests the crowd-sourced hint list at 600A, the hints server 186 provides the crowd-sourced hint list, 605A, and the hints manager at target UE 1 stores the crowd-sourced hint list to assist in the initial loading of web pages by target UE 1's mobile web browser, 610A. In an example, the request of 600A may be issued to the hints server 186 during a period of relative network idleness or inactivity for the target UE 1, or based on a network connection type (e.g., turn on periodic hints reporting while WiFi-connected and turn-off the periodic hints reporting when connected to a slower and/or more expensive connection type). In a further example, the request of 600A can be accompanied with hint list criteria to refine the scope of a version of the crowd-sourced hint list sent to the target UE 1 at 605A. For example, the hint list criteria can include a list of web pages for which web page resource information is already cached by the target UE 1 so that the hints server 186 can optionally exclude hints related to these web pages from the crowd-based hints list at 605A. In another example, the hint list criteria determined can identify areas of interest for an operator of the target UE 1, so that the hints server 186 can refine the crowd-sourced hints list to include hints related to web pages that are relevant to those particular areas of interest (while excluding web pages that are not relevant to those particular areas of interest). Additional examples of hint list criteria is described below with respect to FIG. 6B. While not shown in FIG. 6A, 600A through 610A can repeat on a periodic basis to refresh the crowd-sourced hint list maintained on the target UE 1. Also, while the crowd-sourced hint list is provisioned to the target UE 1 via a "pull" type mechanism (i.e., the hints manager explicitly requests the crowd-sourced hint list), in other embodiments, a "push" type mechanism can be implemented whereby the hints server 186 sends the crowd-source hint list to the target UE 1 on a periodic or event-driven basis (e.g., each time the crowd-sourced hint list is significantly updated, etc.).

Referring to FIG. 6A, at some point after acquiring the crowd-sourced hint list, the mobile web browser determines to request the given web page, 615A. As noted above, it is assumed for the purposes of explaining FIG. 6A that the given web page has not yet been loaded on the mobile web browser at target UE 1 (at least, not recently). Accordingly, the mobile web browser loads one or more hints associated with the given web page from the crowd-sourced hint list maintained on the target UE 1 by the hints manager, 620A, and the mobile web browser then determines web page resource information based on the loaded hints and loads the web page based on the determined web page resource information, 625A. As noted above, this web page resource information would conventionally only be available if the mobile web browser on target UE 1 itself loaded the web page. However, by crowd-sourcing web page loading hints between UEs via the hints server 186, the target UE 1 can leverage the web page resource information derived at other UEs and then selectively filtered by the hints server 186 for relevance to the target UE 1.

After loading the given web page by the mobile web browser on the target UE 1 at 625A, the mobile web browser can optionally provide feedback related to how effective or helpful the hint(s) for the given web page were with respect to the loading of 625A, 630A. For example, assume that the hints for the given web page included eighteen (18) IP addresses related to 18 corresponding content-related URLs embedded in the web-page, and that only fifteen (15) out of these 18 content-related URLs were still valid, with the remaining three IP addresses requiring a refresh via DNS resolution. In this case, indications of which IP addresses were helpful and which hints were not helpful can be reported to the hints server 186 at 630A. The hints server 186 can then selectively update the crowd-sourced hints list based on the hints performance feedback, 635A. In the feedback example provided above, the hints for the three IP addresses that are no longer valid could have their relevance values reduced and could potentially be removed from the crowd-sourced hints list altogether at 635A.

Figure 6B:
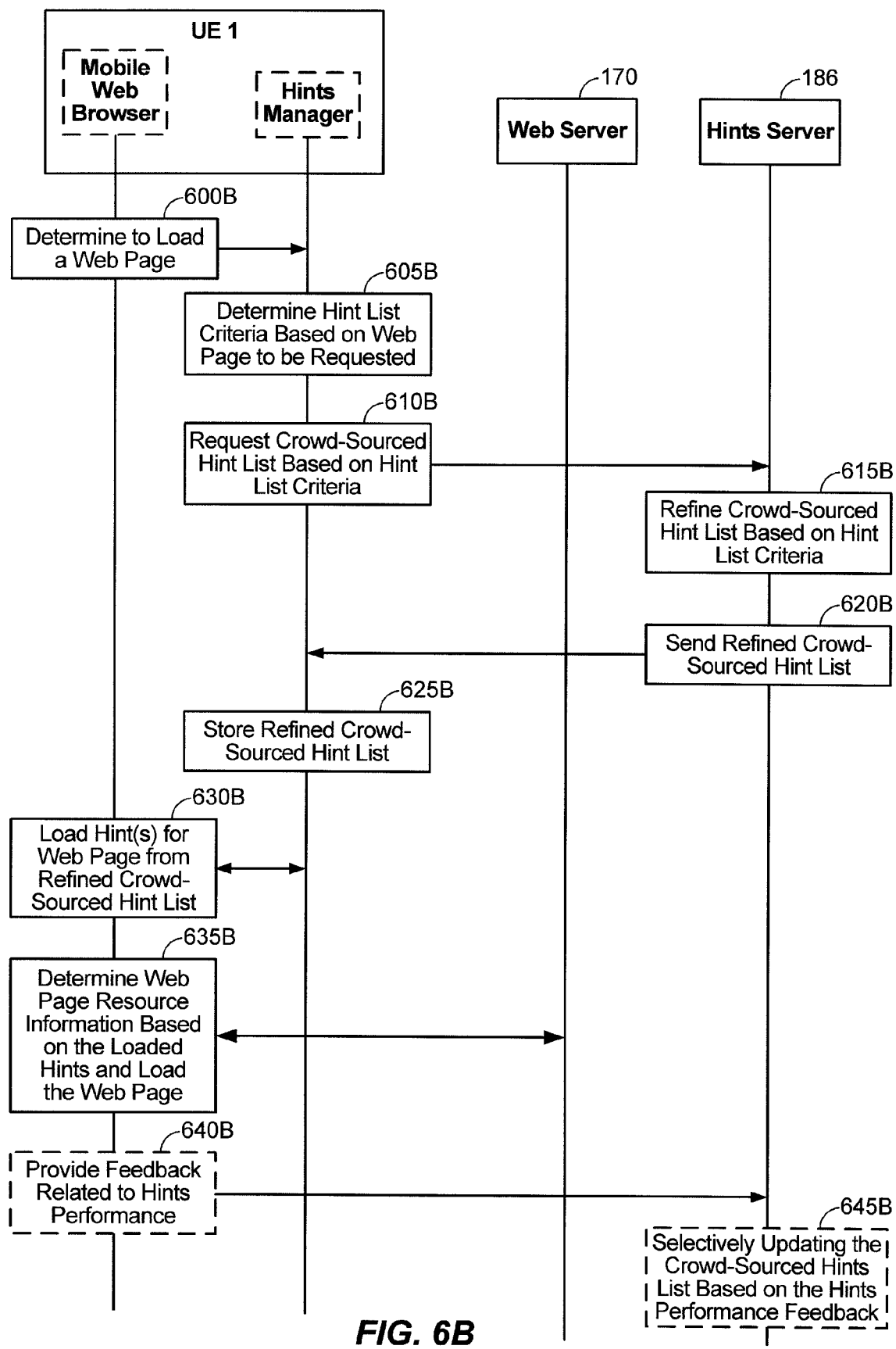
FIG. 6B illustrates a process of performing the initial load of the web page at the target UE based on the crowd-sourced hint list in accordance with another embodiment of the invention.

FIG. 6B illustrates a process of performing the initial load of the web page at the target UE based on the crowd-sourced hint list in accordance with another embodiment of the invention. Similar to FIG. 6A, FIG. 6B illustrates a process whereby the target UE 1 loads web pages directly from the web server 170 (i.e., without necessarily involving a dedicated proxy server as will be described with respect to FIG. 6C, below). However, unlike FIG. 6A, the crowd-sourced hint list in FIG. 6B is requested in conjunction with loading a particular web page.

Referring to FIG. 6B, similar to FIG. 6A, assume that target UE 1 has either not yet loaded the given web page or at least does not have cached web page resource information for the given web page. Under this assumption, the mobile web browser determines to request the given web page, 600B, and a hints manager at target UE 1 determines hint list criteria to refine the scope of a version of the crowd-sourced hint list to be requested by the target UE 1, 605B. For example, the hint list criteria determined at 605B can include a list of web pages for which web page resource information is already cached by the target UE 1 so that the hints server 186 can optionally exclude hints related to these web pages from the crowd-sourced hints list. In another example, the hint list criteria determined at 605B can correspond to areas of interest for an operator of the target UE 1, so that the hints server 186 can refine the crowd-sourced hints list to include hints related to web pages that are relevant to those particular areas of interest (while excluding web pages that are not relevant to those particular areas of interest). At the very least, in the embodiment of FIG. 6B, the hint list criteria determined at 605B identifies the given web page that the mobile web browser determined to load at 600B so that the refined crowd-sourced hint list will at least include web page resource information relevant to that particular web page.

After determining the hint list criteria at 605B, the hints manager at target UE 1 requests the crowd-sourced hint list based on the hint list criteria, 610B, the hints server 186 refines the crowd-sourced hint list for target UE 1 based on the hint list criteria, 615B, the hints server 186 provides the refined crowd-sourced hint list to the hints manager, 620B, and the hints manager at target UE 1 stores the refined crowd-sourced hint list to assist in the initial loading of web pages (in particular, the given web page) by target UE 1's mobile web browser, 625B. At this point, 630B through 645B substantially correspond to 620A through 635A of FIG. 6A and thereby will not be described further for the sake of brevity. Thereby, FIG. 6B demonstrates that the crowd-sourced hint list can be requested in conjunction with the mobile web browser determining to load a particular web page, and further that the crowd-sourced hint list can be refined specifically to assist the mobile web browser load the particular web page.

Figure 6C:
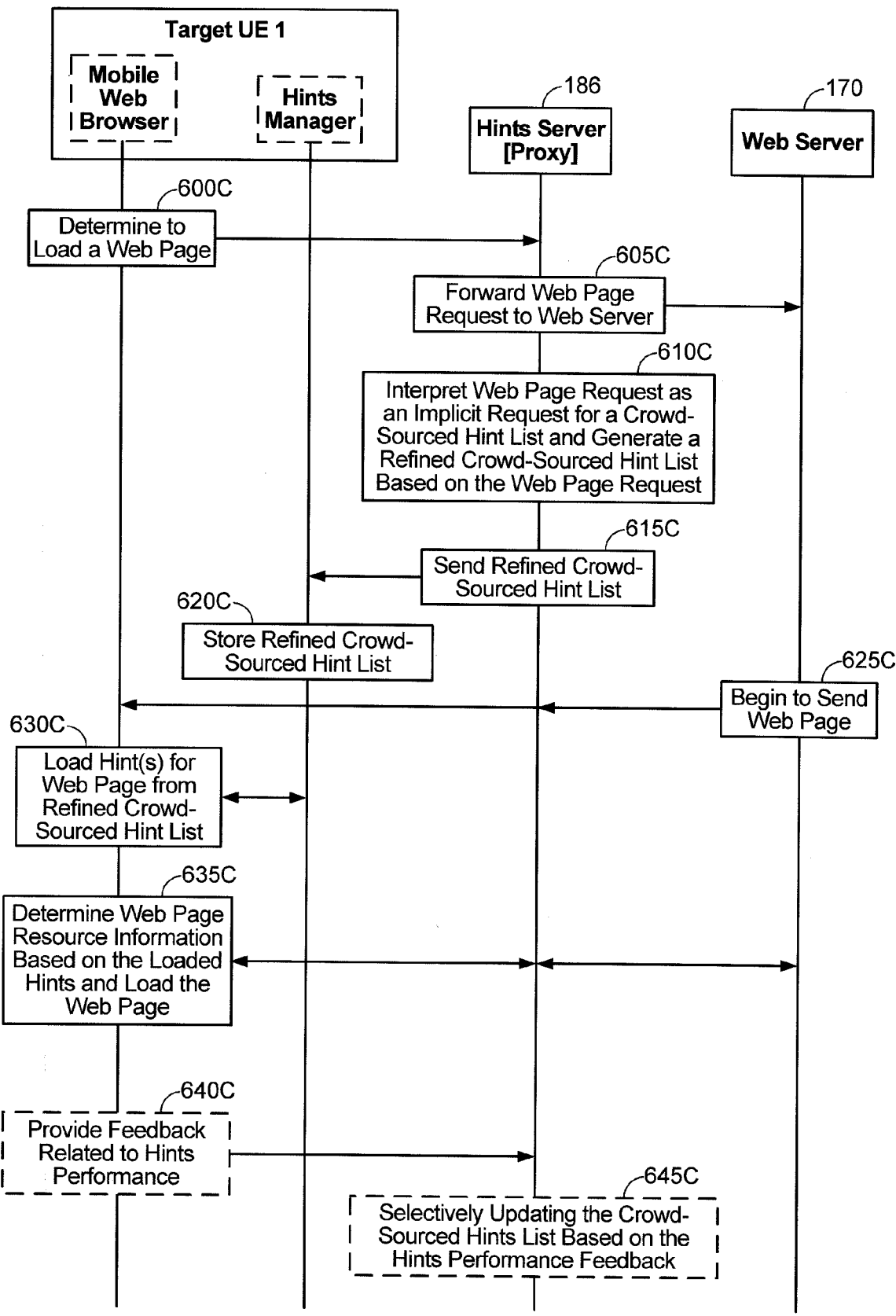
FIG. 6C illustrates a process of performing the initial load of the web page at the target UE based on the crowd-sourced hint list in accordance with another embodiment of the invention.

FIG. 6C illustrates a process of performing an initial load of a web page based on a crowd-sourced hint list in accordance with another embodiment of the invention. While the processes of FIGS. 6A and 6B relate to web page loading directly from the web server 170, in FIG. 6C the hints server 186 functions as a proxy server for the target UE 1 with respect to Internet traffic, such that a substantial portion (or all) Internet traffic (e.g., web-browsing, etc.) is routed to the target UE 1 via the hints server 186.

Referring to FIG. 6C, similar to FIGS. 6A and 6B, assume that target UE 1 has either not yet loaded the given web page or at least does not have cached web page resource information for the given web page. Under this assumption, the mobile web browser determines to request the given web page, and thereby transmits a request for the given web page to the hints server 186 which is acting as the target UE 1's proxy server, 600C. The hints server 186 receives the request for the given web page and forwards the web page request to the web server 170 so that the web page request can begin to be processed, 605C. The hints server 186 also interprets the web page request as an implicit request for a crowd-sourced hints list, and the hints server 186 refines the crowd-sourced hints list based on the given web page being requested in the web page request, 610C. The web page request of 600C is thereby analogous to the hint list criteria from FIG. 6B in the sense that the hints server 186 is prompted to refine or reduce the crowd-sourced hint list to accommodate a specific web page.

The hints server 186 provides the refined crowd-sourced hint list to the hints manager at target UE 1, 615C, and the hints manager at target UE 1 stores the refined crowd-sourced hint list to assist in the initial loading of the given web page, 620C. Accordingly, the given web page begins (or continues) to be downloaded from the web server 170 via the hints server 186 acting as proxy, 625C. At this point, 630C through 645C substantially correspond to 620A through 635A of FIG. 6A and thereby will not be described further for the sake of brevity.

Figure 7:
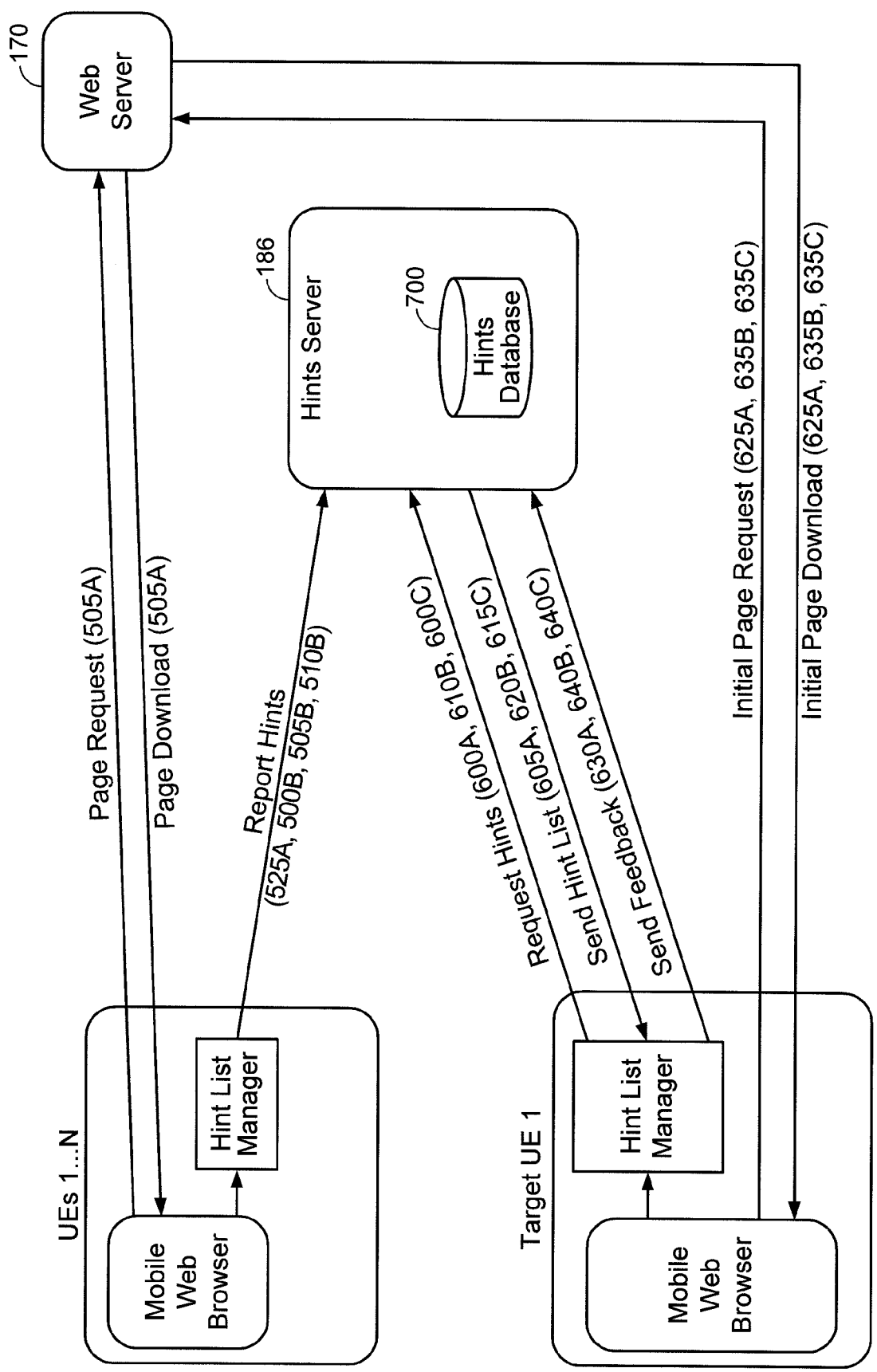
FIG. 7 illustrates a flowchart of the processes of FIGS. 5A through 7B being implemented in a communications system in accordance with an embodiment of the invention.

FIG. 7 illustrates a flowchart of the processes of FIGS. 5A through 6C being implemented in a communications system in accordance with an embodiment of the invention. Referring to FIG. 7, UEs 1 ... N issue page request and download pages as described above with respect to 505A of FIG. 5A. The hint list manager at UEs 1 ... N then reports hints as in 525A or any of 500B through 510B of FIG. 5B. The hints server 186 uses the reported hints to generate the crowd-sourced hint list that is stored in a hints database 700. Target UE 1 later requests the hint list as described above with respect to 600A of FIG. 6A, 610B of FIG. 6B and/or 600C of FIG. 6C, the hints server 186 provides the hint list as in 605A of FIG. 6A, 620B of FIG. 6B and/or 615C of FIG. 6C, the target UE uses the hint list to perform an initial load of a web page at 625A of FIG. 6A, 635B of FIG. 6B and/or 635C of FIG. 6C, and the target UE 1 optionally sends feedback related to the hint list's performance at 630A of FIG. 6A, 640B of FIG. 6B and/or 640C of FIG. 6C.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another, A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a user equipment (UE), comprising:
    determining to load a web page via a mobile browsing application on the UE;
    obtaining, from a web server associated with the web page, web page resource information that is required to load the web page on the UE;
    loading the web page on the UE using the web page resource information;
    determining, by the UE based on the web page resource information obtained from the web server, one or more hints for assisting one or more mobile browsing applications on at least one other UE to perform an initial load of the web page without interacting with the web server to acquire the web page resource information; and
    reporting the one or more hints to a hints server for selective distribution of the one or more hints to the at least one other UE.

2. The method of claim 1, wherein the web page resource information includes (i) one or more IP addresses attached to one or more Uniform Resource Locators (URLs) embedded within the web page, and/or (ii) one or more re-direction chains.

3. The method of claim 1, wherein the one or more hints include (i) one or more IP addresses attached to one or more Uniform Resource Locators (URLs) embedded within the web page, and/or (ii) one or more re-direction chains.

4. The method of claim 1, further comprising:
    determining, in response to the determination to load the web page, that no cached web page resource information acquired via a previous loading of the web page is available on the UE,
    wherein the obtaining is performed in response to the unavailability determination.

5. The method of claim 1, wherein the initial load of the web page corresponds to a loading of the web page on the at least one other UE without cached web page resource information acquired via a previous loading of the web page by the at least one other UE.

6. The method of claim 1, wherein the reporting is performed in response to satisfying one or more hints update rules.

7. The method of claim 6, wherein the one or more hints update rules include (i) a first hints update rule corresponding to periodically reporting the one or more hints to the hints server, (ii) a second hints update rule corresponding to reporting the one or more hints to the hints server in an event-based manner, and/or (iii) a third hints update rule corresponding to reporting the one or more hints to the hints server in a pseudo-random and/or probabilistic manner.

8. The method of claim 7, wherein the first hints update rule corresponds to periodically reporting the one or more hints to the hints server at a given time interval or at every Nth loading of the web page by the UE.

9. The method of claim 7, wherein the second hints update rule corresponds to reporting the one or more hints to the hints server in response to the UE establishing a network connection to a network of a given type.

10. The method of claim 7, wherein the third hints update rule corresponds to reporting the one or more hints pseudo-randomly and/or probabilistically so that a target percentage of loads by the UE for the web page result in reports being sent to the hints server.

11. A method of operating a hints server, comprising:
receiving, from one or more UEs, one or more hints that are based upon web page resource information acquired from a web server that is required to load a web page at the one or more UEs;
evaluating a relevance of the one or more hints with respect to an initial load of the web page at one or more target UEs;
selectively generating or updating a crowd-sourced hints list based on the relevance of the one or more hints; and
sending the crowd-sourced hints list to the one or more target UEs to assist the one or more target UEs perform the initial load of the web page without interacting with the web server to acquire the web page resource information.

12. The method of claim 11,
wherein the evaluating identifies a first set of hints for loading non-advertisement content for the web page and a second set of hints for loading advertisement data for the web page,
wherein the evaluating allocates higher relevance to the first set of hints and lower relevance to the second set of hints based on the identification.

13. The method of claim 12, wherein the selectively generating or updating excludes the second set of hints from the crowd-sourced hints list.

14. The method of claim 11,
wherein the evaluating identifies a first set of hints that are reported by a first number of UEs from the one or more UEs and a second set of hints that are reported by a second number of UEs from the one or more UEs,
wherein the first number is higher than the second number, and
wherein the evaluating allocates higher relevance to the first set of hints and lower relevance to the second set of hints based on the first set of hints being reported by a higher number of UEs.

15. The method of claim 14, wherein the selectively generating or updating excludes the second set of hints from the crowd-sourced hints list based on the lower relevance allocation.

16. The method of claim 11,
wherein a given hint is associated with a given expiration period,
wherein the evaluating allocates higher relevance to the given hint if the given expiration period has not expired and lower relevance to the given hint if the given expiration period has expired.

17. The method of claim 11, further comprising:
receiving, from the one or more target UEs, one or more additional hints that are based upon additional web page resource information acquired from the web server in association with the initial load of the web page using the crowd-sourced hints list;
evaluating a relevance of the one or more additional hints with respect to the initial load of the web page at the one or more target UEs;
selectively updating the crowd-sourced hints list based on the relevance of the one or more additional hints.

18. The method of claim 11, wherein the web page resource information includes (i) one or more IP addresses attached to one or more Uniform Resource Locators (URLs) embedded within the web page, and/or (ii) one or more re-direction chains.

19. The method of claim 11, wherein the one or more hints include (i) one or more IP addresses attached to one or more Uniform Resource Locators (URLs) embedded within the web page, and/or (ii) one or more re-direction chains.

20. The method of claim 11, wherein the sending occurs in response to a request for the crowd-sourced hints list from the one or more target UEs that is independent of the target UEs determining to perform the initial load of the web page.

21. The method of claim 11, wherein the sending occurs in response to a request for the crowd-sourced hints list from the one or more target UEs that is triggered by the target UEs determining to perform the initial load of the web page.

22. The method of claim 11, wherein the sending occurs in response to a request for the initial load of the web page from the one or more target UEs without an explicit request for the crowd-sourced hints list, wherein receipt of the request for the initial load of the web page is interpreted by the hints server as an implicit request for the crowd-sourced hints list to assist in performing the initial load of the web page at the one or more target UEs.

23. The method of claim 11, further comprising:
refining the crowd-sourced hints list based on UE-specific hint list criteria for the one or more target UEs,
wherein the sending sends the refined crowd-sourced hints list to the one or more target UEs.

24. The method of claim 23,
wherein the UE-specific hint list criteria includes a list of web pages for which the one or more target UEs already have locally available web page resource information,
wherein the refining excludes, from the refined crowd-sourced hints list, at least a portion of the web page resource information for the listed web pages.

25. The method of claim 23,
wherein the UE-specific hint list criteria identifies one or more areas of interest associated with operators of the one or more target UEs,
wherein the refining excludes, from the refined crowd-sourced hints list, web page resource information for one or more web pages that are not associated with the identified one or more areas of interest, and
wherein the refining includes, within the refined crowd-sourced hints list, web page resource information for one or more web pages that are associated with the identified one or more areas of interest.

26. The method of claim 11, wherein the initial load of the web page at the one or more target UEs corresponds to a loading of the web page on the one or more target UEs without cached web page resource information acquired via a previous loading of the web page by the one or more target UEs.

27. A method of operating a target user equipment (UE), comprising:
receiving a crowd-sourced hints list from a hints server to assist the target UE to perform an initial load of a web page, the crowd-sourced hints list listing one or more hints generated by one or more other UEs based upon web page resource information acquired from a web server by the one or more other UEs that is required to load the web page at the one or more other UEs;

obtaining the web page resource information for the web page based on the crowd-sourced hints list without interacting with the web server to acquire the web page resource information; and loading the web page using the web page resource information that is obtained based on the crowd-sourced hints list.

28. The method of claim 27, wherein the web page resource information includes (i) one or more IP addresses attached to one or more Uniform Resource Locators (URLs) embedded within the web page, and/or (ii) one or more re-direction chains.

29. The method of claim 27, further comprising:
obtaining, from the web server, additional web page resource information for loading the web page on the target UE;

determining, based on the additional web page resource information obtained from the web server, one or more hints for assisting mobile browsing applications on one or more additional UEs to perform an initial load of the web page; and reporting the one or more hints to the hints server for selective distribution to the one or more additional UEs.

30. The method of claim 29, wherein the one or more hints include (i) one or more IP addresses attached to one or more Uniform Resource Locators (URLs) embedded within the web page, and/or (ii) one or more re-direction chains.

31. The method of claim 27, wherein the receiving receives the crowd-sourced hints list in response to a request for the crowd-sourced hints list that is sent by the target UE independent of the target UE determining to load the web page.

32. The method of claim 27, wherein the receiving receives the crowd-sourced hints list in response to a request for the crowd-sourced hints list that is sent by the target UE in response to the target UE determining to load the web page.

33. The method of claim 27, wherein the receiving receives the crowd-sourced hints list in response to a request for the crowd-sourced hints list that is sent by the target UE to the hints server for loading the web page without an explicit request for the crowd-sourced hints list, wherein receipt of the request for the initial load of the web page is configured to be interpreted by the hints server as an implicit request for the crowd-sourced hints list to assist in performing the loading of the web page at the target UE.

34. The method of claim 27, wherein the crowd-sourced hints list is refined by the hints server based on UE-specific hint list criteria for the target UE.

35. The method of claim 34,
wherein the UE-specific hint list criteria includes a list of web pages for which the target UE already has locally available web page resource information, and wherein the crowd-sourced hints list is refined to exclude at least a portion of the web page resource information for the listed web pages.

36. The method of claim 34,
wherein the UE-specific hint list criteria identifies one or more areas of interest associated with operators of the target UE, wherein the crowd-sourced hints list is refined to exclude web page resource information for one or more web pages that are not associated with the identified one or more areas of interest, and wherein the crowd-sourced hints list is refined to include the web page resource information for one or more web pages that are associated with the identified one or more areas of interest.

37. The method of claim 27, wherein the initial load of the web page at the target UE corresponds to a loading of the web page on the target UE without cached web page resource information acquired via a previous load of the web page by the target UE.

38. A user equipment (UE), comprising:
means for determining to load a web page via a mobile browsing application on the UE;

means for obtaining, from a web server associated with the web page, web page resource information that is required to load the web page on the UE;

means for loading the web page on the UE using the web page resource information;

means for determining, based on the web page resource information obtained from the web server, one or more hints for assisting one or more mobile browsing applications on at least one other UE to perform an initial load of the web page without interacting with the web server to acquire the web page resource information; and means for reporting the one or more hints to a hints server for selective distribution of the one or more hints to the at least one other UE.

39. A hints server, comprising:
means for receiving, from one or more UEs, one or more hints that are based upon web page resource information acquired from a web server that is required to load a web page at the one or more UEs;

means for evaluating a relevance of the one or more hints with respect to an initial load of the web page at one or more target UEs;

means for selectively generating or updating a crowd-sourced hints list based on the relevance of the one or more hints; and means for sending the crowd-sourced hints list to the one or more target UEs to assist the one or more target UEs perform the initial load of the web page without interacting with the web server to acquire the web page resource information.

40. A target user equipment (UE), comprising:
means for receiving a crowd-sourced hints list from a hints server to assist the target UE to perform an initial load of a web page, the crowd-sourced hints list listing one or more hints generated by one or more other UEs based upon web page resource information acquired from a web server by the one or more other UEs that is required to load loading the web page at the one or more other UEs;

means for obtaining the web page resource information for the web page based on the crowd-sourced hints list without interacting with the web server to acquire the web page resource information; and means for loading the web page using the web page resource information that is obtained based on the crowd-sourced hints list.

41. A user equipment (UE), comprising:
logic configured to determine to load a web page via a mobile browsing application on the UE;

logic configured to obtain, from a web server associated with the web page, web page resource information that is required to load the web page on the UE;

logic configured to load the web page on the UE using the web page resource information;

logic configured to determine, based on the web page resource information obtained from the web server, one or more hints for assisting one or more mobile browsing applications on at least one other UE to perform an initial load of the web page without interacting with the web server to acquire the web page resource information; and logic configured to report the one or more hints to a hints server for selective distribution of the one or more hints to the at least one other UE.

42. A hints server, comprising:

logic configured to receive, from one or more UEs, one or more hints that are based upon web page resource information acquired from a web server that is required to load a web page at the one or more UEs;

logic configured to evaluate a relevance of the one or more hints with respect to an initial load of the web page at one or more target UEs;

logic configured to selectively generate or update a crowd-sourced hints list based on the relevance of the one or more hints; and logic configured to send the crowd-sourced hints list to the one or more target UEs to assist the one or more target UEs perform the initial load of the web page without interacting with the web server to acquire the web page resource information.

43. A target user equipment (UE), comprising:

logic configured to receive a crowd-sourced hints list from a hints server to assist the target UE to perform an initial load of a web page, the crowd-sourced hints list listing one or more hints generated by one or more other UEs based upon web page resource information acquired from a web server by the one or more other UEs that is required to load loading the web page at the one or more other UEs;

logic configured to obtain the web page resource information for the web page based on the crowd-sourced hints list without interacting with the web server to acquire the web page resource information; and logic configured to load the web page using the web page resource information that is obtained based on the crowd-sourced hints list.

44. A non-transitory computer-readable medium containing instructions stored thereon, which, when executed by a user equipment (UE), cause the UE to perform operations, the instructions comprising:

at least one instruction to cause the UE to determine to load a web page via a mobile browsing application on the UE;

at least one instruction to cause the UE to obtain, from a web server associated with the web page, web page resource information that is required to load the web page on the UE;

at least one instruction to cause the UE to load the web page on the UE using the web page resource information;

at least one instruction to cause the UE to determine, based on the web page resource information obtained from the web server, one or more hints for assisting one or more mobile browsing applications on at least one other UE to perform an initial load of the web page without interacting with the web server to acquire the web page resource information; and at least one instruction to cause the UE to report the one or more hints to a hints server for selective distribution of the one or more hints to the at least one other UE.

45. A non-transitory computer-readable medium containing instructions stored thereon, which, when executed by a hints server, cause the hints server to perform operations, the instructions comprising:

at least one instruction to cause the hints server to receive, from one or more UEs, one or more hints that are based upon web page resource information acquired from a web server that is required to load a web page at the one or more UEs;

at least one instruction to cause the hints server to evaluate a relevance of the one or more hints with respect to an initial load of the web page at one or more target UEs;

at least one instruction to cause the hints server to selectively generate or update a crowd-sourced hints list based on the relevance of the one or more hints; and at least one instruction to cause the hints server to send the crowd-sourced hints list to the one or more target UEs to assist the one or more target UEs perform the initial load of the web page without interacting with the web server to acquire the web page resource information.

46. A non-transitory computer-readable medium containing instructions stored thereon, which, when executed by a target user equipment (UE), cause the target UE to perform operations, the instructions comprising:

at least one instruction to cause the target UE to receive a crowd-sourced hints list from a hints server to assist the target UE to perform an initial load of a web page, the crowd-sourced hints list listing one or more hints generated by one or more other UEs based upon web page resource information acquired from a web server by the one or more other UEs that is required to load loading the web page at the one or more other UEs;

at least one instruction to cause the target UE to obtain the web page resource information for the web page based on the crowd-sourced hints list without interacting with the web server to acquire the web page resource information; and at least one instruction to cause the target UE to load the web page using the web page resource information that is obtained based on the crowd-sourced hints list.

* * * * *